C. T. PFLUEGER.
LUBRICATING DEVICE.
APPLICATION FILED OCT. 2, 1919.
1,384,775.
Patented July 19, 1921.
3 SHEETS—SHEET 1.
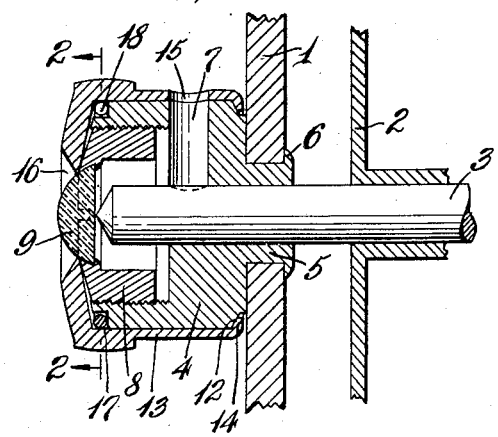
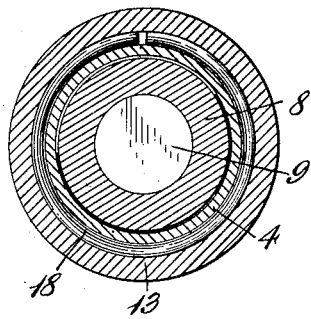
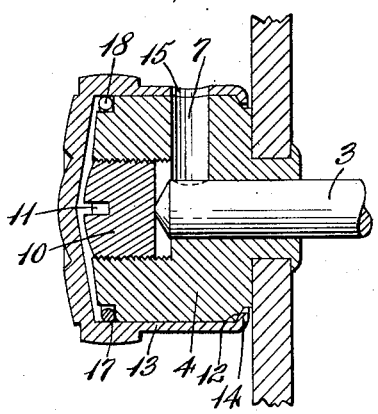
Inventor.
Charles T. Pflueger
By Brockett and Hyde
Attys.

C. T. PFLUEGER.
LUBRICATING DEVICE.
APPLICATION FILED OCT. 2, 1919.
1,384,775.
Patented July 19, 1921.
3 SHEETS—SHEET 2.
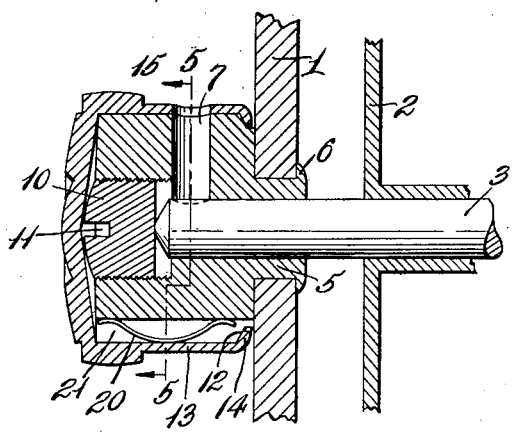
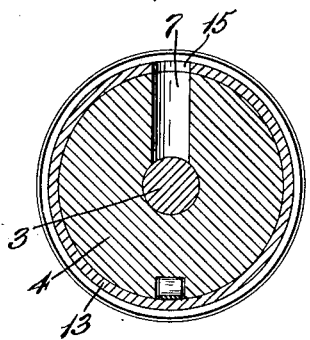

C. T. PFLUEGER.
LUBRICATING DEVICE.
APPLICATION FILED OCT. 2, 1919.

1,384,775.

Patented July 19, 1921.
3 SHEETS—SHEET 3.

Inventor.
Charles T Pflueger
By Brockett and Hyde
Att'ys.

UNITED STATES PATENT OFFICE.

CHARLES T. PFLUEGER, OF AKRON, OHIO, ASSIGNOR TO THE ENTERPRISE MANUFACTURING COMPANY, OF AKRON, OHIO, A CORPORATION OF OHIO.

LUBRICATING DEVICE.

1,384,775.  Specification of Letters Patent.  Patented July 19, 1921.

Application filed October 2, 1919. Serial No. 328,021.

*To all whom it may concern:*

Be it known that I, CHARLES T. PFLUEGER, a citizen of the United States, residing at Akron, in the county of Summit and State of Ohio, have invented certain new and useful Improvements in Lubricating Devices, of which the following is a specification.

This invention relates to lubricating devices such as are used upon fishing reels and the like.

In fishing reels the rotatable spool shaft, and indeed other driving or operating shafts, usually turn in a bearing member carried by the stationary frame, and more particularly by what is known as the end plate of the frame.

The object of the present invention is to provide an improved shaft bearing or shaft surrounding member so arranged as to enable the lubricant to be readily supplied to the rotating parts, but which is provided with a closing cap capable of being turned to open position for supplying the lubricant, as stated, and also to a closed position in which the bearing is sealed against the entrance of dirt and moisture to protect the parts when in use.

A further object of the invention is to provide a construction of this kind which is of simple form and can be embodied in a fishing reel or other device at minimum cost, and which is so formed that the parts are not likely to become detached or lost in use.

A further object of the invention is to provide an improved friction or tension means for holding the inclosing or protecting cap in open or closed position.

Further objects of the invention are in part obvious and in part will appear more in detail hereinafter.

The invention comprises the construction and arrangement of parts hereinafter described and claimed.

Figure 6:
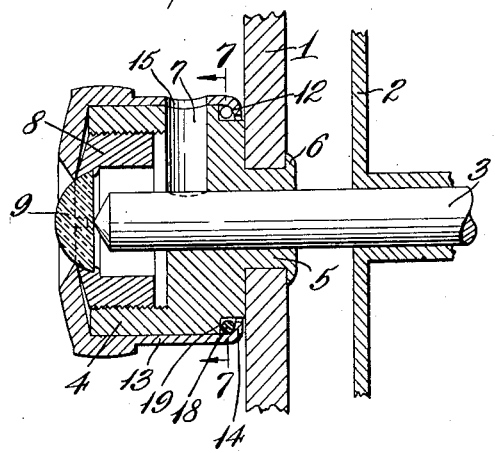
Figure 7:
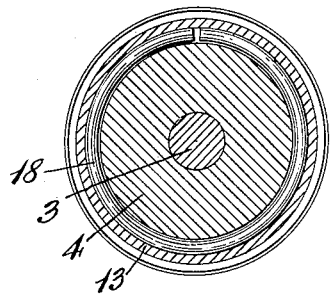

In the drawings, Figure 1 is a sectional elevation illustrating one preferred embodiment of the invention; Fig. 2 is a cross section on the line 2—2, Fig. 1; Fig. 3 is a view similar to Fig. 1 and showing a modification; Fig. 4 is a similar view showing still another modification; Fig. 5 is a cross section on the line 5—5, Fig. 4; Fig. 6 is a view similar to Fig. 1 and showing still another modification; and Fig. 7 is a cross section on the line 7—7, Fig. 6.

Referring to Figs. 1 and 2, 1 indicates a portion of the stationary frame of a fishing reel, to wit, one of the so called end plates which in the complete reel are connected by posts or pillars (not shown) to form a rigid cage or frame structure. In this frame is mounted the line carrying spool 2, only a part of which is shown. This spool turns upon or rotates with (usually the latter) a shaft 3. Shaft 3 turns in a bearing member 4 which is rigidly mounted in the end plate or frame member 1. In the present construction said bearing member has a reduced sleeve portion 5 passing through an opening in the end plate, said sleeve portion having its inner end portion swaged or beaded over, as at 6, to in effect solidly rivet it to the end plate, whereby it is permanently held in place.

Bearing member 4 has two openings, to wit, the longitudinal opening in which rotates the shaft 3, and a lateral opening 7 extending radially to the axis of the shaft. Bearing member 4 not only serves as a bearing in which the shaft itself rotates, but is usually also provided with an end thrust bearing. For example, in Fig. 1, the member 4 is threaded at its end to receive a plug or hollow sleeve 8 carrying an end thrust bearing member 9, which may be made of agate or some other similar hard bearing substance. Plug 8 may be screwed up to adjust the bearing. The same form of end thrust bearing is illustrated in Fig. 6. Figs. 3 and 4 illustrate a different form of end thrust bearing, comprising a metal or other block 10 threaded into the end opening in the bearing member 4 and provided with suitable means such as the screw driver slot 11, for purposes of adjustment.

The bearing is lubricated by introducing oil or any suitable lubricant through the lateral opening 7, so that the lubricant finds its way to the rotating shaft and works in along the contacting surfaces of the shaft and bearing member as well as to the end thrust bearing.

The present device is also provided with suitable protecting and inclosing means for the bearing. This protecting means is preferably in the form of a sleeve or cap surrounding the bearing member and rotatable or otherwise adjustable thereon to both open and closed positions.

Suitable connections are made between the cap and bearing member so as to preferably permanently retain the cap in place, said connections being of a form simple to construct and nevertheless of permanent form so that the cap will not be lost. The connection between the cap and bearing member is preferably made by spinning or beading a portion of one of said members over or around a transverse shoulder of the other, as will appear.

In Figs. 1, 3, 4 and 6 the bearing member 4 is provided with an annular recess adjacent the end plate 1 forming an inwardly extending annular shoulder 12. The surrounding cap 13 is of thimble form and has its inner edge spun or beaded inwardly over the shoulder 12 to form an annular flange 14, which permanently locks the cap to the bearing member, but in swiveling relation therewith. Said cap is provided at one place with a port or opening 15. Consequently the cap can be turned or swiveled on the bearing member to expose the lubricating passage, as shown in Fig. 1, or can be turned until the port 15 is out of registry with the passage 7 to thereby close the same. Cap 13 may have its end wall solid or continuous, as shown in Fig. 3, to thereby wholly close the bearing, or may have an opening in its end, as shown at 16, Fig. 1, to expose the end thrust bearing member. In the form shown in Fig. 3 the adjustment of the end bearing is of course made before the cap is assembled in place.

Suitable means is preferably also provided for subjecting the rotatable cap to friction or pressure so as to hold the same yieldably in any position to which it may be adjusted. For this purpose the bearing member 4 shown in Fig. 1, is provided near its outer end with the annular channel or recess 17 in which lies a split spring wire ring 18, the outward pressure of which produces friction upon the cap. This spring ring may be a portion cut from a spiral so that it not only exerts outward or radial pressure but also produces pressure longitudinally of the axis, thereby holding the flange 14 tightly against the shoulder 12.

In the form shown in Fig. 6 the spring ring 18 is in a groove or channel 19 located at the inner end of the bearing member 4, or in other words, close to the end plate 1. Indeed, the transverse shoulder of the channel 19 is the same shoulder around which the inwardly extending flange 14 is spun.

In Fig. 4 the friction device is a bent strip spring 20 of curved form lying in a longitudinal slot or chamber 21 of the bearing member and exerting outward thrust upon the cap.

In all constructions the parts may be readily lubricated or may be closed up to tightly seal the bearing against dirt and moisture.

What I claim is:—

1. A fishing reel provided with a frame including an end head, a spool having a shaft extending through said head, a journal bearing member secured to said end head and in which said shaft rotates, an end bearing member for said shaft adjustable endwise thereof in said journal bearing member, and a cap inclosing and rotatable on said journal bearing member and permanently attached thereto and arranged when attached to prevent adjustment of said end bearing member.

2. A fishing reel provided with a frame including an end head, a spool having a shaft extending through said head, a journal bearing member secured to said end head and in which said shaft rotates, an end bearing member for said shaft adjustable endwise thereof in said journal bearing member, and a cap inclosing and rotatable on said journal bearing member and permanently attached thereto and arranged when attached to prevent adjustment of said end bearing member, said cap and journal bearing member being provided with openings adapted by rotation of the cap to be brought into registration for lubricating the bearing.

In testimony whereof I affix my signature

CHARLES T. PFLUEGER.